United States Patent [19]

Homuth

[11] 4,086,844

[45] May 2, 1978

[54] HYDRAULIC CYLINDER UTILIZING CORRUGATED RUNNING SURFACES

[76] Inventor: Kenneth C. Homuth, 1885 E Old Shakopee Rd., Minneapolis, Minn. 55437

[21] Appl. No.: 659,127

[22] Filed: Feb. 18, 1976

[51] Int. Cl.² ............................................. F16J 15/18
[52] U.S. Cl. ........................................ 91/418; 92/159; 92/168; 92/174; 92/249; 308/4 R
[58] Field of Search ............. 92/158, 165 R, 83, 159, 92/174, 162 R, 162 P, 251, 252, 168, 249; 91/418; 308/4 R, 5 R

[56] References Cited

U.S. PATENT DOCUMENTS

| 1,313,905 | 8/1919 | Mummert | 92/158 |
| 1,360,498 | 11/1920 | Chandlee | 92/158 |
| 1,877,530 | 9/1932 | Read | 92/158 |
| 2,291,243 | 7/1942 | Levy | 92/165 R |
| 2,638,124 | 5/1953 | Nickerson | 92/165 R |
| 2,837,384 | 6/1958 | Johnson | 92/158 |
| 3,521,531 | 7/1970 | Kaesemodel | 92/158 |
| 3,544,118 | 12/1970 | Klein | 92/162 R |
| 3,603,213 | 9/1971 | Tootle | 92/165 R |
| 3,631,766 | 1/1972 | Kraakman | 92/162 P |
| 3,659,504 | 5/1972 | Zurcher | 92/162 |
| 3,781,022 | 12/1973 | Kumabe | 92/169 |

FOREIGN PATENT DOCUMENTS

| 2,213,399 | 9/1973 | Germany | 92/162 |
| 472,999 | 10/1937 | United Kingdom | 92/162 R |
| 934,134 | 8/1963 | United Kingdom | 92/158 |

*Primary Examiner*—Martin P. Schwadron
*Assistant Examiner*—Abraham Hershkovitz
*Attorney, Agent, or Firm*—Paul L. Sjoquist

[57] ABSTRACT

The piston of a hydraulic cylinder is provided with a corrugated running surface composed of angularly disposed ribs and valleys therebetween, the ribs bearing against the relatively smooth bore of the tubular casing in which the piston reciprocates. Whereas the ribs on the piston provide a corrugated running surface bearing against the bore, the cylinder head, in which the piston rod is journaled, is formed with a similarly corrugated running surface.

3 Claims, 6 Drawing Figures

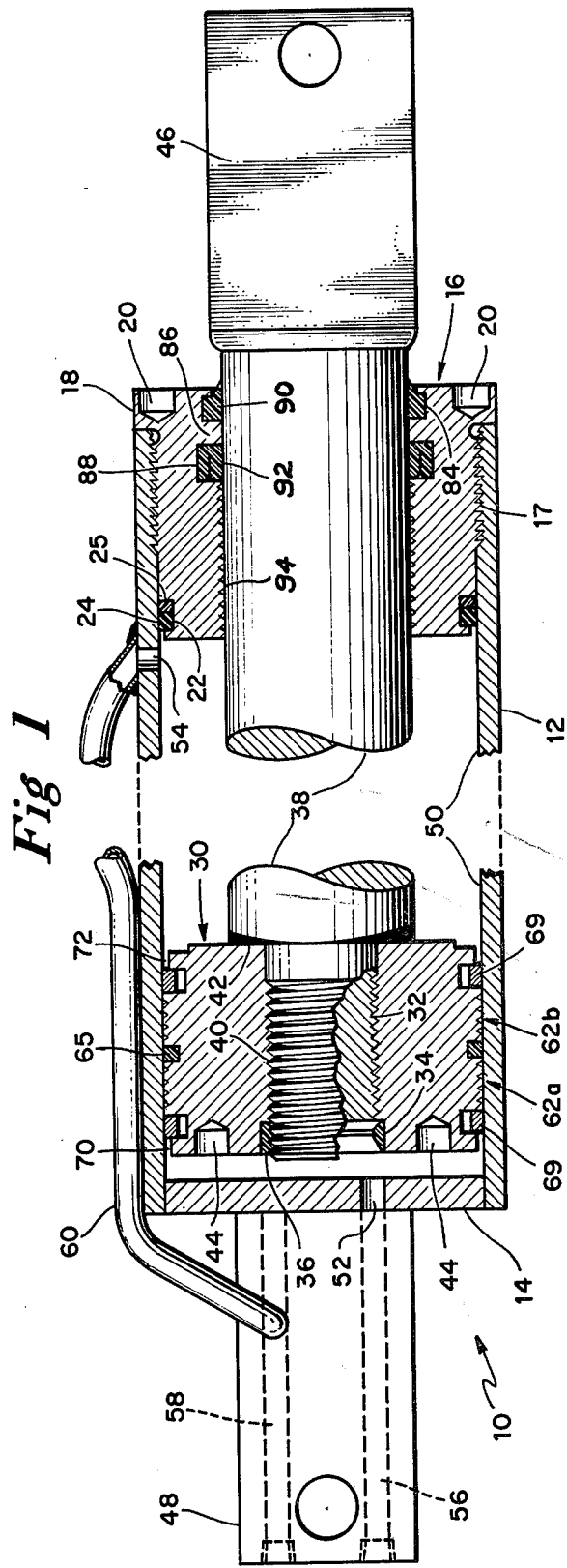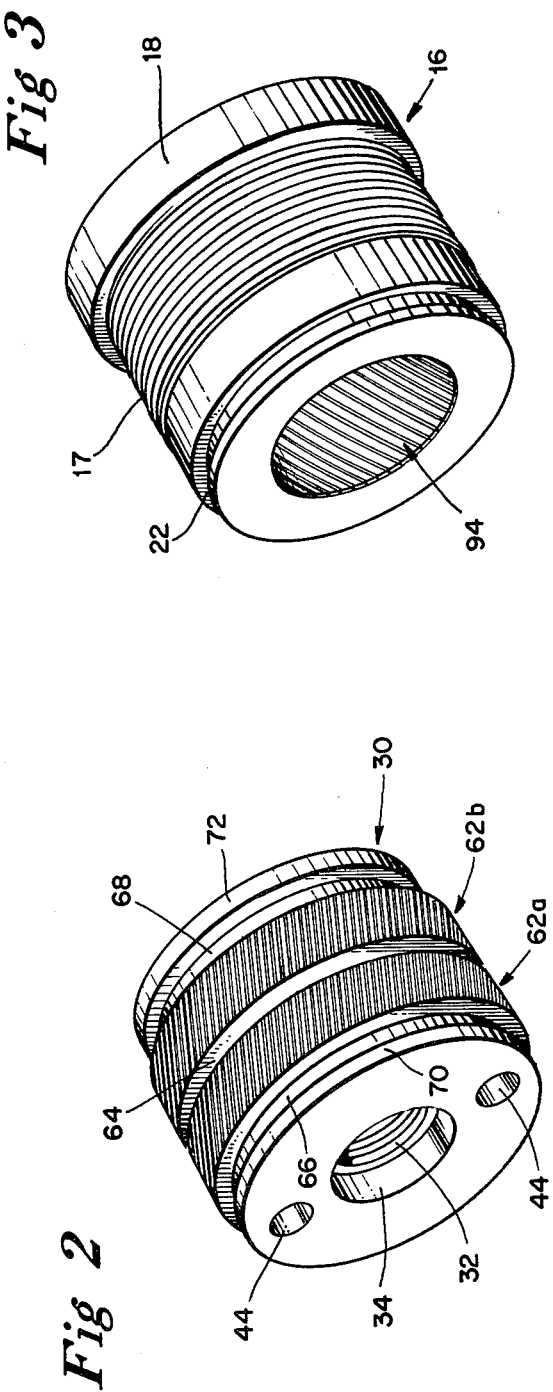

HYDRAULIC CYLINDER UTILIZING CORRUGATED RUNNING SURFACES

BACKGROUND OF THE INVENTION

1. Field of the Invention

This invention relates generally to hydraulic cylinders, and pertains more particularly to a hydraulic cylinder provided with corrugated running or bearing surfaces.

2. Description of the Prior Art

The manufacturers of hydraulic cylinders strive to achieve uniform clearances. However, in practice, the diameters of the pistons will vary with respect to each other, and the diameters of the casing bores will vary with each other. If a piston having a diameter at one end of the tolerance range is placed in a bore having a diameter at the other end of the tolerance range, then it is apparent that the worst type of clearance condition exists. In addition, there can be ovality differences between bores. All of which factors contribute to having running fits that are too loose, too tight and non-uniform. Therefore, these shortcomings result in non-uniform performance and service life.

Hydraulic cylinders make use of theoretically cylindrical running or bearing surfaces. In practice, these "cylindrical" surfaces are not truly cylindrical, either being oval to begin with or becoming so in use. The degree of ovality varies quite widely because of a number of factors.

Most piston-type hydraulic cylinders are double-acting which means that oil under pressure is selectively introduced into either end of the casing to provide movement in the proper direction. Usually, one end of the casing is "closed" and the other "open", the piston rod extending through the open end. In such a situation, the piston in conjunction with the bore provides one running or bearing surface and the journal provided in the cylinder head at the open end of the casing in conjunction with the piston rod provides another running or bearing surface.

In an effort to lessen troubles experienced in the field, the factory has at times resorted to selecting a piston found to have one diameter and selecting a casing have a suitable bore diameter for the piston that has been selected in order to obtain the optimum clearance between these two components. This practice permits greater variations in the tolerances during the making of the parts, and the effect of the otherwise larger tolerances can be reduced via the selection route. However, matching a given piston with a particular casing takes time and is a costly procedure. The problem of bore ovality, however, is not overcome by resort to this select fit process.

In a number of cases, expensive bearing metal overlays have been applied to the piston bearing surface and/or the head journal for the piston rod. Another attempt to solve the problem has been to employ bearing wear rings on the piston surfaces. Neither of the above contribute to providing optimum clearances and conformability, particularly in the case of the alluded to wear rings. Actually, the wear ring procedure aggravates the non-uniformity of diameter fit problem, since it adds to component tolerance stacks and materially reduces soft seal life and since it requires additional clearance between the piston and the casing bore. This increased clearance objectionably increases the so-called extrusion gap. More specifically, there is a reduction in the support at each side of the soft seal.

With respect to the journals located in the cylinder heads of hydraulic cylinders, a problem arises in this region regarding improper clearances. In this regard, the journal is smaller than the piston diameter. Consequently, the journal is subjected to higher side load hot spots and wear than the piston, because the unit loading is normally appreciably greater. Owing to the reduced amount of contact, this being because of the smaller diameter, the more concentrated loading produces the hot spots because of the lack of an adequate oil film. Additionally, where there is a misalignment or lack of concentricity between the piston rod and casing bore, this misalignment is also present as far as the cylinder head journal and piston rod. The misalignment further contributes to the presence of hot spots.

SUMMARY OF THE INVENTION

One object of the invention is to provide a hydraulic cylinder having uniform, optimum circumferential conformity and running clearances between production tolerance variable bore-piston diameters and bores of tolerance variable ovality.

Another object is to accomplish maximum uniform cylinder axial alignment and minimum uniform bearing surface clearances, thereby providing longer bearing wear and the longest possible soft seal life.

A further object of the invention is to deliberately reduce production component clearance by approximately half of what has heretofore been deemed normal. More specifically, an aim of the invention is to provide a corrugated oil film surface which allows local and anti-galling ovality wear, and optimum sizing and conformation to be realized between the sliding members.

Yet another object is to eliminate the need or use of metal overlays or wear rings as the bearing surfaces of hydraulic cylinder pistons and head rod journals, both of which are relatively expensive and neither of which contribute to the provision of optimum clearances and conformability, this being true particularly so as far as wear rings are concerned, for they add to the non-uniformity of diametric fits because they add to component tolerance stacks as well as materially reducing soft seal life, since wear rings require additional clearance between the piston and the surrounding casing bore.

A further object of the invention is to allow minimum uniform "wear in" clearances between non-ferrous pistons and ferrous bores in spite of differing thermal expansion rates. Also, an aim is to permit the use of similar materials for the piston and bore without fear of galling.

Inasmuch as the piston rod journal in the cylinder head is considerably smaller in diameter than that of the piston, it is vulnerable to greater side load hot spots and wear. Accordingly, still another object of the invention is to provide an oil film over a much greater portion of the piston rod surface than has existed with previous rod journals, thereby producing a lower unit loading and a virtual elimination of hot spot conditions that have caused difficulties in the past.

Briefly, my invention provides a corrugated surface on the piston of a hydraulic cylinder, as well as on the journal in the cylinder head for the piston rod, the corrugated configuration being composed of angularly oriented ribs and valleys. The ribs possess a truncated appearance when viewed in cross section. The valleys have a V-shaped configuration and serve as small canals for channeling the oil so that the plateaus on the ribs always have a film of oil thereon, thus improving the lubricating properties or characteristics of the running surfaces. By minimizing the running clearances, better support adjacent the seals can be realized so that they do not wear as readily, which has occurred in the past because of the resulting extrusion effect to which the seals are subjected when relatively large clearances or poor fits exist. The invention, in effect, provides a custom realization of smaller clearances realized during actual use of the hydraulic cylinder in service. Thus, my invention provides for an actual wearing in of the running surfaces with respect to each other so that the adverse effects of ovality eccentricity, and tolerance variable diameters are for all intents and purposes eliminated.

BRIEF DESCRIPTION OF THE DRAWINGS

FIG. 1 is a longitudinal sectional view of a hydraulic cylinder exemplifying my invention, a center portion of the cylinder having been removed in order to permit a larger scale to be used;

FIG. 2 is a perspective view of the piston of FIG. 1, the view showing to better advantage the corrugations on the piston;

FIG. 3 is a perspective view of the cylinder head showing the corrugations utilized in the journaling of the piston rod;

DESCRIPTION OF THE PREFERRED EMBODIMENT

Figure 4:
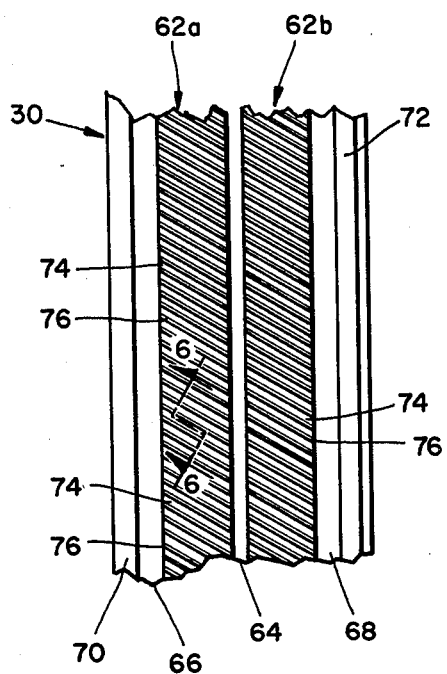
FIG. 4 is a developed view of portions of the two corrugated bands on the piston.
Figure 5:
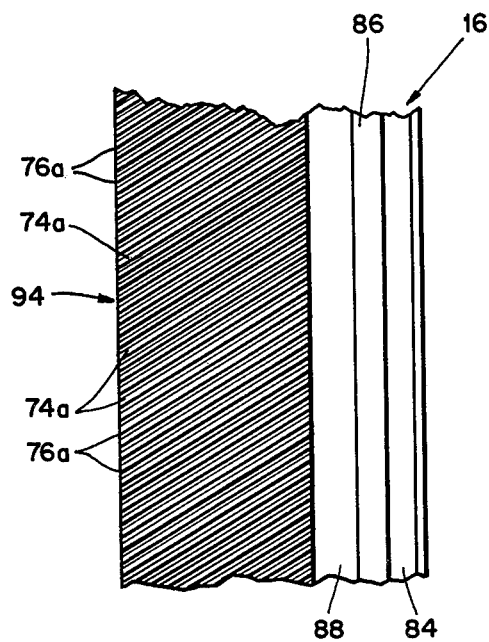
FIG. 5 is a developed view of a portion of the corrugated journal of the cylinder head.
Figure 6:
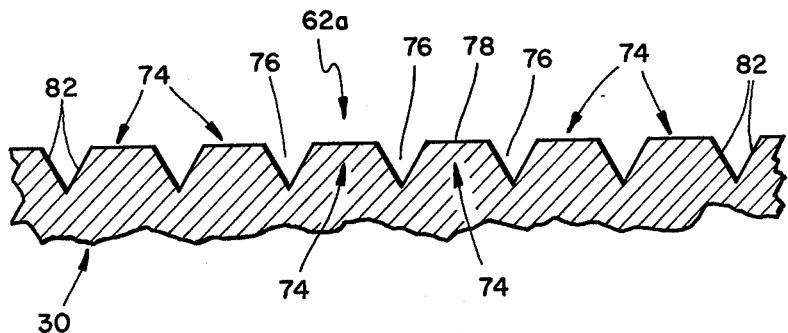
FIG. 6 is a greatly enlarged sectional view taken in the direction of line 6—6 of FIG. 4.

Referring first to FIG. 1, the hydraulic cylinder utilizing the teachings of my invention therein has been denoted generally by the reference numeral 10. It comprises a tubular casing 12 (a major longitudinal portion thereof having been removed from the center in this figure in order to permit use of a larger drawing scale), a head 14 at the left or closed end that is welded in place. Since the head 14 is fixedly attached to the tubular casing 12, no seals other than that resulting from the welding are needed.

A head 16 is removably engaged within the other end of the casing 12 by means of threads 17. The cylinder head 16 has a flange 18 that abuts against the right end of the casing 12, there being a plurality of spanner wrench holes 20 provided in the outer face of the head 16. The cylinder head 16 is grooved at 22 so as to accommodate a resilient O-ring 24 and a back-up ring 25. More will be said hereinafter concerning the construction of the cylinder head 16.

At this time, attention is directed to an aluminum piston designated generally by the reference numeral 30. The piston 30 is formed with a threaded bore 32 having a counterbore at 34 which functions as a female pilot portion for the accommodation therein of a deformable ring 36.

The piston 30 is mounted on a steel piston rod 38, there being a threaded section 40 frequently called a "stinger" which enables the piston 30 to be threadedly attached to the rod 38, sufficient relative advancement of the piston 30 onto the stinger causing the piston 30 to abut against a shoulder 42 formed on the piston rod, the shoulder 42 serving as a stop. As with the cylinder head 16, the piston 30 is provided with spanner wrench holes 44 which facilitate the mounting of the piston on the rod 38.

It might be explained at this stage that the specific manner in which the piston 30 is mounted on the piston rod 38 is described and claimed in my co-pending application for "Hydraulic Cylinder with Concentrically Maintained Piston and Rod", Ser. No. 637,362, filed Dec. 3, 1975, now abandoned.

The piston rod 38 projects through the cylinder head 16, having a lug 46 thereon by which it can be connected to the device or equipment (not shown) to be actuated. Similarly, the fixed head 14 at the other end of the tubular casing 12 has a lug projecting therefrom so that this end of the casing 12 can be suitably connected to the device or equipment to be actuated.

Since the piston 30 is to be reciprocally moved back and forth within the tubular casing 12, more specifically its bore labeled 50, a pair of fluid ports 52, 54 are provided adjacent the opposite ends of the casing 12. In this regard, the port 52 is located in the head 14, whereas the fluid port 54 is located in the casing adjacent the head 16. For the sake of illustration, the means for introducing oil under pressure through the fluid port 52 includes a longitudinal passage 56 leading to the port 52 from a hydraulic pump (not shown). Similarly, oil under pressure is introduced through the fluid port 54 by a second passage 58 formed in the lug 48 and a tube 60 extending from the passage 58 to said port 54.

Consequently, it will be appreciated that oil under pressure can be selectively introduced through either fluid port 52 or 54 through the agency of a suitable control valving which is conventionally connected in the hydraulic circuitry between the pump and the inlets at the left of the passages 56, 58. When the piston 30 is to be moved to the right, that is from the position illustrated in FIG. 1, oil under pressure is introduced through the passage 56 leading to port 52, whereas when the piston 30 is to be forced in an opposite direction, that is back to the position in which it appears in FIG. 1, oil is introduced through the passage 58 and tube 60 to the port 54.

As best discerned from FIG. 2, the surface of the piston is provided with two corrugated bands 62a and 62b. These bands 62a, 62b extend from a centrally located annular groove 64 containing a seal shown as a resilient O-ring 65 for drafting simplicity, the bands 62a, 62b extending toward the opposite ends of the piston 30. However, the bands 62a, 62b terminate in a spaced relation with respect to each piston end. More specifically, the band 62a extends to a groove 66 and the band 62b to a groove 68. A conventional cast iron piston ring 69 is free to move in each groove 66, 68. Extending from the groove 66 to the left end of the piston 30 is a reduced diameter portion 70, and extending from the groove 68 to the right end of the piston is a similarly reduced diameter portion 72.

Describing now each band 62a, 62b with greater particularity, it will be perceived that these bands are identical and are formed with alternating ribs 74 and valleys 76 disposed at an acute angle with respect to the longitudinal axis of the hydraulic cylinder 10, that is at an acute angle with respect to the path in which the piston 30 is reciprocated back and forth; more specifically, the acute angle used in actual practice is approximately 30°. Between each pair of ribs 74 is a valley 76, the ribs and valleys alternating with each other around the complete circumference of the piston. More specifically, as can be best seen from FIG. 7, each rib 74 has a truncated appearance when viewed in cross section in that a plateau or strip-like surface 78 is formed.

While the depth or root of the valleys 76 is susceptible to variation depending on the particular design of hydraulic cylinder 10, a typical depth would be on the order of 0.015 inch. Although the clearance between the piston 30 and the bore 50 can vary, depending upon various design parameters, a typical range of clearances is from 0.003 to 0.006 inch. The metal supplied by reason of the truncated ribs 74 provide an adequate amount of aluminum that can be worn away and still have a substantial portion of each valley 76 remain, even though perhaps somewhat shallower.

In this way, when the tubular casing 12 has somewhat of an oval or non-cylindrical configuration or size, either when it leaves the factory or developed during service, the presence of the ribs 74 will permit the piston 30 to conform readily to the size of the bore 50. If the bore 50 is slightly ovalated, then the piston 30, more specifically the ribs 74 thereon, assume a corresponding degree of ovality during the wear in period. Hence, close manufacturing tolerances are less critical. Also, when the tubular casing 12 and piston 30 are subjected to thermal gradients, there will be distortion due to differential expansion, the present invention accommodating such expansion, especially when repeated. It should be appreciated that the coefficient of expansion of aluminum is substantially greater than that of steel. However, when the aluminum returns to its cooled condition, it contracts, and any unnecessarily large initial clearance is only increased from that provided at the time of manufacture in prior art hydraulic cylinders not making use of my invention.

Turning now to a further description of the cylinder head 16, it will be seen that the portion of the head adjacent the flange 18 has a grooved section 84 that extends toward the left to an internal shoulder or flange 86. To the left of the flange 86 is a groove 88. The grooved section 84 accommodates a wiper 90, whereas the groove 88 accommodates therein a U-shaped resilient seal 92.

As far as the invention is concerned, it will be perceived that the cylinder head 16 functions as a bearing for the piston rod 38. The journal portion, which has been assigned the reference numeral 94, of the head 16 extends from the groove 88 to the left end of the head 16. More specifically, the bore constituting the journal 94 is corrugated, being composed of alternating ribs 74a and valleys 76a corresponding to the earlier-mentioned ribs 74 and valleys 76 contained in the bands 62a, 62b on the piston. The provision of the ribs 74a and valleys 76a allows an oil film "nesting" over a relatively large portion of the surface of the piston rod 38 than previously with a resulting lower unit loading than heretofore and a virtual elimination of hot spots. The valley 76a function as canals to conduct oil to the various ribs 74a to provide the foregoing oil film throughout the journal 94.

Hence, there is always a supply of lubricant as far as the plateau 78a on each rib 74a (and the plateau 78 on each rib 74) is concerned and the flat surfaces or plateaus 78, 78a, as the case may be, are thus assured of a film of oil which in turn assures adequate lubrication.

I claim:
1. In combination,
 a. a cylinder having a closed first end, and a second end defining a cylinderhead having a passage therethrough;
 b. a piston reciprocable within said cylinder;
 c. a piston rod connected to said piston and sealably projecting through said cylinderhead passage;
 d. means for selectively admitting pressurized hydraulic fluid into said cylinder to cause reciprocation of said piston;
 e. a plurality of parallel ribs and valleys arranged around the circumference of said piston, said ribs and valleys being aligned at an acute angle with respect to the directions of reciprocation of said piston, said ribs having a top flat surface for contacting said cylinder and said valleys being V-shaped;
 f. a journal in said cylinderhead, said journal having an inner surface for contacting said piston rod, said inner surface having a plurality of ribs and valleys arranged around its circumference, said ribs and valleys being aligned at an acute angle with respect to the directions or reciprocation of said piston rod, said ribs having a top flat surface for contacting said piston rod and said valleys being V-shaped;
 g. a circumferential groove around said piston and intersecting said parallel ribs and valleys; and
 h. a resilient O-ring sealing member in said circumferential groove.

2. The apparatus of claim 1, wherein the acute angle of said ribs and valleys is approximately 30° with respect to the directions of reciprocation.

3. The apparatus of claim 2, wherein the depth of said valleys is about 0.015 inch.

* * * * *